United States Patent
Takemoto

(10) Patent No.: US 9,555,648 B2
(45) Date of Patent: Jan. 31, 2017

(54) METHOD OF MANUFACTURING RECORDED MATTER, MANUFACTURING DEVICE OF RECORDED MATTER AND RECORDED MATTER

(71) Applicant: Seiko Epson Corporation, Tokyo (JP)

(72) Inventor: Kiyohiko Takemoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/789,024

(22) Filed: Mar. 7, 2013

(65) Prior Publication Data

US 2013/0235116 A1 Sep. 12, 2013

(30) Foreign Application Priority Data

Mar. 7, 2012 (JP) ................. 2012-050115

(51) Int. Cl.
*B41J 2/015* (2006.01)
*B41J 11/00* (2006.01)
(Continued)

(52) U.S. Cl.
CPC .............. *B41J 11/0015* (2013.01); *B32B 3/10* (2013.01); *B41J 2/01* (2013.01); *B41J 2/2117* (2013.01);
(Continued)

(58) Field of Classification Search
CPC ....... B41J 2/005; B41J 2/211; B41J 2002/005; B41J 2/0057; B41J 2002/012; B41J 2/22; B41J 11/002; B41J 2/01; B41F 17/001; B41M 5/0256; B41M 7/0081; B41M 1/17; B41M 1/40; B41M 15/00; B41M 15/01; B41M 15/50; B41M 15/52; B41P 2200/31; B32B 3/10
(Continued)

(56) References Cited

U.S. PATENT DOCUMENTS 5,623,296 A 4/1997 Fujino et al.
6,059,407 A 5/2000 Komatsu et al.
(Continued)

FOREIGN PATENT DOCUMENTS

JP 62-001426 B2 1/1987
JP 03-056573 A 3/1991
(Continued)

OTHER PUBLICATIONS

U.S. Appl. No. 14/602,838, filed Jan. 22, 2015, Method of Manufacturing Recorded Matter, Manufacturing Device of Recorded Matter and Recorded Matter.

*Primary Examiner* — Matthew Luu
*Assistant Examiner* — Patrick King
(74) *Attorney, Agent, or Firm* — Nutter McClennen & Fish LLP; John J. Penny, Jr.; Alex Nagorniy

(57) ABSTRACT

Provided is a method of manufacturing a recorded matter including applying a first ink including a volatile first liquid to an intermediate transfer medium having ultraviolet transmittance; applying, using an ink jet method, second ink including a coloring agent and a polymerizable compound polymerized by irradiation of ultraviolet to locations on the intermediate transfer medium where first ink is applied; partially polymerizing the polymerizable compound by irradiating surface side of the intermediate transfer medium to which the second ink is applied with ultraviolet rays from the opposite side surface; transferring the second ink irradiated by ultraviolet in the polymerizing of the polymerizable compound to a recording medium; and curing the polymerizable compound configuring the second ink transferred to the recording medium.

8 Claims, 1 Drawing Sheet

(51) Int. Cl.
*B41J 2/01* (2006.01)
*B32B 3/10* (2006.01)
*B41J 2/21* (2006.01)
*B41M 7/00* (2006.01)

(52) U.S. Cl.
CPC ....... *B41M 7/0081* (2013.01); *B41J 2002/012* (2013.01); *Y10T 428/24802* (2015.01)

(58) Field of Classification Search
USPC ....................................................... 347/103
See application file for complete search history.

(56) References Cited

U.S. PATENT DOCUMENTS

| | | | |
|---|---|---|---|
| 6,084,619 A | 7/2000 | Takemoto et al. | |
| 6,286,953 B1 | 9/2001 | Takemoto et al. | |
| 7,360,887 B2 * | 4/2008 | Konno | B41J 2/01 347/101 |
| 9,108,452 B2 | 8/2015 | Takemoto et al. | |
| 2001/0022607 A1 | 9/2001 | Takahashi et al. | |
| 2002/0175986 A1 * | 11/2002 | Miyamoto | 347/106 |
| 2005/0110856 A1 * | 5/2005 | Mouri et al. | 347/103 |
| 2005/0128268 A1 | 6/2005 | Takashima | |
| 2005/0270351 A1 * | 12/2005 | Mouri et al. | 347/103 |
| 2006/0214970 A1 | 9/2006 | Hirakawa | |
| 2006/0238592 A1 * | 10/2006 | Kadomatsu et al. | 347/102 |
| 2008/0032072 A1 | 2/2008 | Taniuchi et al. | |
| 2008/0043082 A1 | 2/2008 | Yahiro | |
| 2008/0184930 A1 | 8/2008 | Furukawa | |
| 2008/0199631 A1 * | 8/2008 | Makuta | B41M 7/0081 427/511 |
| 2009/0079808 A1 | 3/2009 | Uemura et al. | |
| 2009/0207198 A1 | 8/2009 | Muraoka | |
| 2009/0237479 A1 | 9/2009 | Yamashita et al. | |
| 2009/0244146 A1 * | 10/2009 | Chiwata | B41J 11/002 347/14 |
| 2009/0317555 A1 | 12/2009 | Hori | |
| 2009/0318613 A1 | 12/2009 | Ageishi et al. | |
| 2010/0156971 A1 * | 6/2010 | Ikeda et al. | 347/9 |
| 2010/0245510 A1 * | 9/2010 | Ageishi | 347/102 |
| 2011/0048324 A1 | 3/2011 | Yamashita et al. | 118/620 |
| 2011/0181675 A1 * | 7/2011 | Takemoto | 347/102 |
| 2011/0227990 A1 | 9/2011 | Kuwabara et al. | |
| 2011/0230623 A1 * | 9/2011 | Hirano et al. | 525/309 |
| 2012/0013694 A1 * | 1/2012 | Kanke | 347/103 |
| 2012/0055361 A1 | 3/2012 | Takemoto | |
| 2012/0058285 A1 | 3/2012 | Takemoto | |
| 2012/0156444 A1 | 6/2012 | Takemoto et al. | |
| 2012/0262525 A1 | 10/2012 | Ohnishi | |
| 2013/0235136 A1 | 9/2013 | Takemoto et al. | |
| 2014/0110931 A1 | 4/2014 | Richert et al. | |
| 2014/0354744 A1 | 12/2014 | Ohnishi | |
| 2015/0197100 A1 | 7/2015 | Takemoto | |

FOREIGN PATENT DOCUMENTS

| | | |
|---|---|---|
| JP | 03-079678 A | 4/1991 |
| JP | 03-160068 A | 7/1991 |
| JP | 04-018462 A | 1/1992 |
| JP | 07-089067 A | 4/1995 |
| JP | 10-202998 A | 8/1998 |
| JP | 10-250052 A | 9/1998 |
| JP | 3177985 B2 | 6/2001 |
| JP | 3206797 B2 | 9/2001 |
| JP | 2001-347747 A | 12/2001 |
| JP | 2006-130725 A | 5/2006 |
| JP | 2006-264267 A | 10/2006 |
| JP | 2007-301993 A | 11/2007 |
| JP | 2008-006816 A | 1/2008 |
| JP | 2008-018716 A | 1/2008 |
| JP | 2008006816 A * | 1/2008 |
| JP | 2008-265324 A | 11/2008 |
| JP | 2009-072927 A | 4/2009 |
| JP | 2009-083314 A | 4/2009 |
| JP | 2009-226852 A | 10/2009 |
| JP | 2009226852 A * | 10/2009 |
| JP | 2010-043154 A | 2/2010 |
| JP | 2010-202736 A | 9/2010 |
| JP | 2011-105865 A | 6/2011 |
| JP | 2011-110793 A | 6/2011 |
| JP | 2011-173405 A | 9/2011 |
| JP | 2012-051286 A | 3/2012 |
| JP | 2012-051287 A | 3/2012 |
| JP | 2012-051293 A | 3/2012 |
| JP | 2012-126025 A | 7/2012 |
| JP | 2012-126026 A | 7/2012 |

* cited by examiner

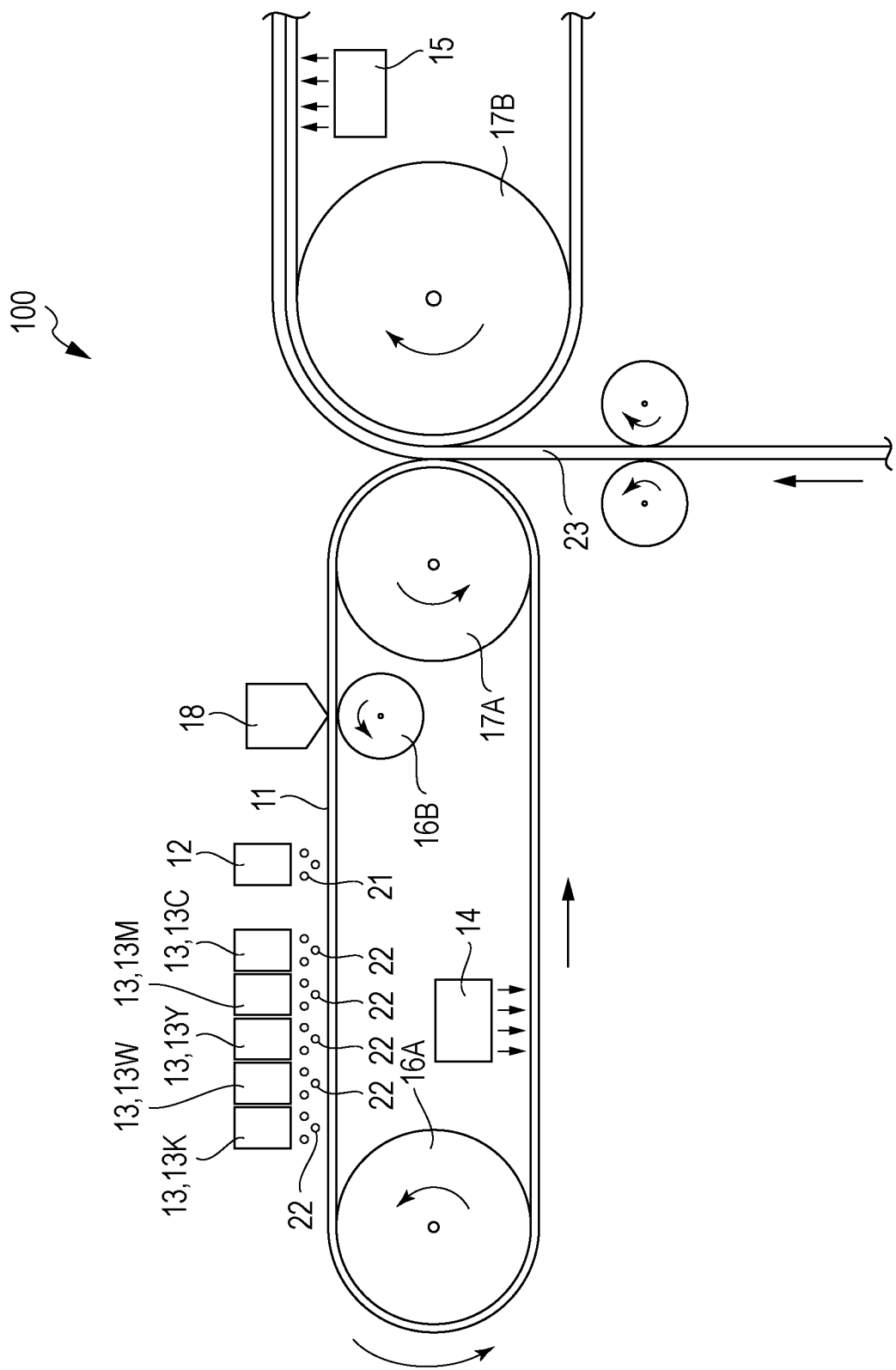

METHOD OF MANUFACTURING RECORDED MATTER, MANUFACTURING DEVICE OF RECORDED MATTER AND RECORDED MATTER

BACKGROUND

1. Technical Field

The present invention relates to a method of manufacturing a recorded matter, a manufacturing device of a recorded matter and a recorded matter.

2. Related Art

As a method of manufacturing a recorded matter, a method using an ink jet method is widely used. The ink jet method is excellent on the points that a minute pattern may be appropriately formed, a plate is unnecessary, and the method may appropriately correspond to small lot production and multiproduct production.

However, in a case in which direct printing is performed on a recording medium using the ink jet method, according to the type of recording medium (for example, a non-absorbent medium, such as a recording medium made of plastic which is not provided with an ink absorbing layer), there are problems such as flowing or cissing of the ink on the recording medium occurring, time being required for drying (hardening) of the ink applied to the medium, disturbance occurring in the undried (unhardened) ink image during the discharge or the like of the recording medium to which ink is applied, and it is difficult to reliably form a printing portion in a desired shape.

In order to solve these problems, an intermediate transfer method of recording method is used (for example, refer to Japanese Patent No. 3177985).

However, in the related art, it is difficult to sufficiently prevent the above problems from occurring, even using the intermediate transfer method of recording method. In addition, in the intermediate transfer method of the recording method of the related art, there are problems in that it is difficult to make the fixity of the printing portion to the recording medium sufficiently superior, and fixing requires high energy.

In particular, the above tendency occurs remarkably in a case where a film material manufactured of plastic and used as a packaging or the like for a product is used as the recording medium.

SUMMARY

An advantage of some aspects of the present invention is to provide a method of manufacturing a recorded matter capable of reliably and efficiently manufacturing a recorded matter provided with a printing portion having superior fixity and a desired shape, to provide a manufacturing device of a recorded matter capable of reliably and efficiently manufacturing a recorded matter provided with a printing portion having superior fixity and a desired shape and, in addition, to provide a recorded matter provided with a printing portion having superior fixity and a desired shape.

The advantage is achieved by the invention described below.

According to an aspect of the invention, there is provided a method of manufacturing a recorded matter including applying a first ink including applying a first ink including a volatile first liquid to an intermediate transfer medium having ultraviolet transmittance; applying, using an ink jet method, a second ink including a coloring agent and a polymerizable compound polymerized by irradiation of ultraviolet rays to locations on the intermediate transfer medium to which the first ink is applied partially polymerizing the polymerizable compound by irradiating surface side of the intermediate transfer medium to which the second ink is applied with ultraviolet rays from the opposite side surface; transferring the second ink irradiated by ultraviolet in the polymerizing of the polymerizable compound to a recording medium; and curing the polymerizable compound configuring the second ink transferred to the recording medium.

In so doing, a method of manufacturing a recorded matter may be provided which is able to reliably and efficiently manufacture a recorded matter provided with a printing portion having excellent fixity and a desired shape.

In the method of manufacturing a recorded matter according to the aspect of the invention, it is preferable that the boiling point $T_{bp1}$ of the first liquid be 50° C. or higher to 150° C. or lower.

In so doing, it is possible to more reliably prevent the occurrence an adverse influence due to remaining of first liquid on the recorded matter finally obtained, and to make the transferability of the second ink from the intermediate transfer medium to the recording medium more reliably superior.

In the method of manufacturing a recorded matter according to the aspect of the invention, it is preferable that the first ink cause the surface free energy of the intermediate transfer medium to be reduced.

In so doing, it is possible to make the transferability of the second ink from the intermediate transfer medium to the recording medium particularly superior, to more reliably form a printing portion in a desired shape and to make the productivity of the recorded matter particularly superior.

In the method of manufacturing a recorded matter of the aspect of the invention, it is preferable that surface tension of the first ink be preferably lower than surface tension of the intermediate transfer medium and lower than surface tension of the second ink.

In so doing, forming a film using a uniform first ink in the applying of the first ink, since it is possible in the second ink application to prevent involuntary spreading wetness of the second ink on the intermediate transfer medium, it is possible to more appropriately perform transfer from the intermediate transfer medium to the recording medium of the pattern using the second ink and to make the pattern using the second ink more reliably in a desired shape.

In the method of manufacturing a recorded matter according to the aspect of the invention, it is preferable that the first liquid be a monovalent alcohol.

In so doing, it is possible to make the transferability of the second ink from the intermediate transfer medium to the recording medium particularly superior, to more reliably form a printing portion in a desired shape, and to make the productivity of the recorded matter particularly superior. In addition, it is possible to more reliably prevent first liquid remaining on the recorded matter finally obtained. In addition, ethanol is a material which is able to reliably exhibit the effects of some aspects of the invention even in a case of small usage amounts, and additionally has little burden on the environment. Accordingly, it is preferable from the viewpoint of environmental protection.

In the method of manufacturing a recorded matter according to the aspect of the invention, it is preferable that the second ink include, as the polymerizable compound, a liquid polymerizable compound independently forming a liquid, under conditions of the applying of the second ink.

In so doing, because it is not necessary to use a volatile solvent as a constituent component of the second ink, or the content rate of a volatile solvent may be made low, in the manufacturing of the recorded matter it is possible to not perform or to simplify processing for volatilizing the solvent and it is possible to make the productivity of the recorded matter particularly superior. In addition, in the manufacturing of the recorded matter, it is possible to effectively prevent occurrence of a problem of lowering of the image quality of the printing portions, or the like, due to volatilizing of the solvent.

In the method of manufacturing a recorded matter according to the aspect of the invention, it is preferable that the second ink include allyl glycol as the liquid polymerizable compound.

In so doing, it is possible to more reliably form the printing portions in a desired shape. In addition, it is possible to make the productivity of the recorded matter particularly superior. In addition, it is possible to make the fixing strength in the printing portions of the recorded matter particularly superior.

In the method of manufacturing a recorded matter according to the aspect of the invention, it is preferable that the applying of the first ink be performed using an ink jet method.

In so doing, the first ink may be applied efficiently and selectively to a predetermined region (region corresponding to a region to which second ink is applied) of the intermediate transfer medium, and it is possible to suppress the usage amount of first ink while making the productivity of the recorded matter particularly superior, and is preferable from the viewpoint of resource savings.

In the method of manufacturing a recorded matter according to the aspect of the invention, in the locations to which second ink is transferred in the transferring, it is preferable that the curvature rate of the intermediate transfer medium be larger than the curvature rate of the recording medium.

In so doing, the transferring may be more efficiently performed, and it is possible to make the productivity and the yield of the recorded matter particularly superior. In addition, it is possible to make the fixing strength in the printing portions of the recorded matter particularly superior.

In the method of manufacturing a recorded matter according to the aspect of the invention, in the locations to which second ink is transferred in the transferring, it is preferable that the intermediate transfer medium and the recording medium be mutually curved in a convex shape towards the other side.

In so doing, the transferring may be more efficiently performed, and it is possible to make the productivity and the yield of the recorded matter particularly superior. In addition, it is possible to make the fixing strength in the printing portions of the recorded matter particularly superior. In addition, there are advantages from the viewpoint of size reductions of a manufacturing device used in the manufacturing of a recorded matter.

In the method of manufacturing a recorded matter according to the aspect of the invention, it is preferable that the recording medium have ultraviolet transmittance, and the curing of the polymerizable compound be performed by irradiating ultraviolet rays from the surface of the opposite side to the side to which the second ink is transferred.

In so doing, it is possible for the polymerization reaction to sufficiently progress more reliably and more effectively across the entire thickness direction of the printing portions, and to make the fixing strength of the printing portions with respect to the recording medium, and the durability and reliability of the recorded matter particularly superior.

In the method of manufacturing a recorded matter according to the aspect of the invention, it is preferable that the recording medium be a film configured from a plastic material.

In the related art, in a case where a recording medium is a film composed from the plastic material, it is difficult to reliably form printing portions in a desired shape, and additionally, problems of it being difficult to make the fixity of the printing portions to the printing medium sufficiently superior occur particularly remarkably. In contrast, according to the aspect of the invention, it is possible to reliably prevent the occurrence of the above problems even in cases where the recording medium is the film composed from the plastic material. In other words, in a case where the recording medium is the film composed from the plastic material, the effects according to the aspect of the invention are more remarkably exhibited.

According to another aspect of the invention, there is provided a manufacturing device of a recorded matter including an intermediate transfer medium having ultraviolet transmittance; a first ink application unit applying a first ink including a volatile first liquid to the intermediate transfer medium; a second ink application unit applying, using an ink jet method, a second ink including a coloring agent and a polymerizable compound polymerized by irradiation of ultraviolet rays to locations of the intermediate transfer medium to which the first ink is applied; a first ultraviolet irradiation unit irradiating ultraviolet rays from the opposite surface side of the intermediate transfer medium to the surface to which the second ink is applied; and a second ultraviolet irradiation unit irradiating ultraviolet rays to the second ink transferred to the recording medium.

In so doing, the manufacturing device of the recorded matter may be provided which is able to reliably and efficiently manufacture a recorded matter provided with a printing portion having superior fixity and a desired shape.

According to still another aspect of the invention, there is provided a recorded matter which is manufactured using the method of the aspect of the invention.

In so doing, the recorded matter may be provided with superior fixity and include printing portions having a desired shape.

BRIEF DESCRIPTION OF THE DRAWINGS

The invention will be described with reference to the accompanying drawing, wherein like numbers reference like elements.

FIGURE is a configuration diagram schematically showing a preferred embodiment of a manufacturing device of a recorded matter according to the invention.

DESCRIPTION OF EXEMPLARY EMBODIMENTS

Manufacturing Method and Manufacturing Device of Recorded Matter

First, a manufacturing method and manufacturing device of the recorded matter according to the invention will be described.

A method of manufacturing a recording method according to the invention includes, a first ink application step applying a first ink including a volatile first liquid to an intermediate transfer medium having ultraviolet transmittance; a second ink application step applying, using an ink jet method, a second ink including a coloring agent and a polymerizable compound polymerized by irradiation of ultraviolet rays to locations on the intermediate transfer medium to which the first ink is applied; a first polymerizing step in which the surface of the intermediate transfer medium to which the second ink is applied is irradiated with ultraviolet rays from the opposite surface side and the polymerizable compound is partially polymerized; a transferring step which transfers the second ink irradiated by ultraviolet rays in the first polymerizing step to a recording medium; and a second polymerizing step in which the polymerizable compound configuring the second ink transferred to the recording medium is cured.

In this way, by applying the first ink to a region to which the second ink including a coloring agent and a polymerizable compound is to be applied in advance, before transferring to the recording medium, it is possible to make the efficiency of transfer of the second ink to the recording medium from the intermediate transfer medium while reliably preventing involuntary deformation of the pattern using the second ink by irradiating ultraviolet rays to the surface of the intermediate transfer medium to which the second ink is applied from the opposite surface side and partially polymerizing the polymerizable compound, and as a result, it is possible to reliably and efficiently manufacture a recorded matter having printing portions with a desired shape.

In other words, before transferring to the recording medium, partially polymerizing the polymerizable compound by irradiating surface side of the intermediate transfer medium to which the second ink is applied with ultraviolet rays from the opposite side surface, the stability of the shape of the second ink improves during transfer and the like, and it is possible to reliably prevent the occurrence of disturbance in the pattern using the second ink, and by preferentially polymerizing the polymerizable compound in the parts of the second ink in the regions on the intermediate transfer medium side, the release characteristics of the second ink from the intermediate transfer medium during transfer improve. Furthermore, by the first ink being applied to the intermediate transfer medium in advance, the release characteristics from the intermediate transfer medium of the second ink during transfer become excellent. Furthermore, adverse effects, such as the first liquid, because of having volatility, remaining on the surface of the manufactured recorded matter, the printing portion being softened, and the stability of the shape being decreased are reliably prevented. In other words, in the invention, the above effects act synergistically, and a printing material including printing portions having a desired shape may be reliably and efficiently manufactured.

On the other hand, by irradiating ultraviolet rays from the opposite surface side to the surface of the intermediate transfer medium to which the second ink is applied, since the polymerizable compound is partially polymerized only, in the parts of the second ink on the intermediate transfer medium in the regions on the side opposing the recording medium, after transfer to the recording medium, the invention further includes a second polymerizing step in which the polymerizable compound configuring the second ink is cured and sufficient adhesiveness with respect to the recording medium is ensured. Accordingly, in the recorded matter ultimately obtained, the fixity of the printing portions with respect to the recording medium may be made sufficiently superior.

Below, preferred embodiments of a method of manufacturing a recorded matter and a manufacturing device of the same will be described in greater detail while referencing the attached drawings.

FIG. 1 is a configuration diagram schematically showing a preferred embodiment of a manufacturing device of the recorded matter according to the invention. Moreover, portions of the configuration shown in the drawing referred to in the specification are shown exaggerated, and do not accurately reflect actual dimensions.

As shown in FIG. 1, a manufacturing device 100 includes an intermediate transfer medium 11, a first ink application unit 12 applying a first ink 21 to the intermediate transfer medium 11, a second ink application unit 13 applying a second ink 22, a first ultraviolet irradiation unit 14 irradiating ultraviolet rays to the second ink 22 on the intermediate transfer medium 11, and a second ultraviolet irradiation unit 15 irradiating ultraviolet rays to a second ink 22 transferred onto a recording medium 23.

In the configuration shown in the drawing, the intermediate transfer medium 11 is in the form of an endless belt. Further, the intermediate transfer medium 11 is supported so as to rotate while tension is applied thereby from the inner circumferential surface side by support rollers 16A and 16B and a press roller 17A. In addition, the intermediate transfer medium 11 has a width the same as or greater than the recording medium 23.

The intermediate transfer medium 11 has ultraviolet transmittance. In so doing, as described in detail later, through the first ultraviolet irradiation unit 14, it is possible to irradiate ultraviolet rays to the second ink 22 via the intermediate transfer medium 11.

Examples of the constituent material of the intermediate transfer medium 11 include, for example, various types of resin (for example, polyimide, polyamideimide, polyester, polyurethane, polyamide, polyethersulfone, fluorine-based resins and the like), various types of rubber (for example, nitrile rubber, ethylene propylene rubber, chloroprene rubber, isoprene rubber, styrene rubber, butadiene rubber, butyl rubber, chlorosulfonated polyethylene, urethane rubber, epichlorohydrin rubber, acrylic rubber, silicone rubber, fluorine rubber or the like), or the like. The intermediate transfer medium 11 may have a single layer configuration or a laminated configuration.

It is preferable for the ultraviolet transmittance of the intermediate transfer medium 11 be 70% or greater. In so doing, the ultraviolet rays are efficiently supplied to the second ink 22, and it is possible to cause the polymerization reaction of the polymerizable compound to suitably progress. In addition, it is possible to effectively either prevent or suppress heat due to the intermediate transfer medium 11 absorbing ultraviolet rays.

The first ink application unit 12 applied the first ink 21 including the first liquid to the intermediate transfer medium 11 in the first ink application step.

The first ink application unit 12 may be, for example, a bar coater, a spreading roller or a brush; however, in the configuration in the drawing, the unit is a printing head (droplet ejecting head) performing ejection of droplets using an ink jet method. In so doing, the first ink 21 may be applied efficiently and selectively to a predetermined region (region corresponding to a region to which the second ink 22 is applied) of the intermediate transfer medium 11, and it is possible to suppress the usage amount of the first ink 21 while making the productivity of the recorded matter particularly superior, and is preferable from the viewpoint of resource savings.

A piezo method, or a method ejecting ink due to foam (bubble) generated by heating the ink may be used as the droplet ejection method (ink jet method); however, from the viewpoint of preventing involuntary volatilizing of the first liquid configuring the first ink 21, difficulty in changing the quality of the first ink 21, and the like, the piezo method is preferable.

It is preferable that the thickness of the first ink 21 applied to the intermediate transfer medium 11 be 0.1 μm or more to 5 μm or less.

Moreover, the first ink 21 will be described later in detail.

In the second ink application step, the second ink application unit 13 applies a second ink 22 including a coloring agent and polymerizable compound to locations on the intermediate transfer medium 11 to which the first ink 21 is applied.

In addition, the second application unit 13 is a printing head (droplet ejection head) performing ejection of droplets using an ink jet method. In so doing, it is possible to apply the second ink 22 in a desired pattern, and it is possible to appropriately form the printing portions in a fine pattern in the recorded matter ultimately obtained. In addition, because the ink jet method has superior on-demand qualities and does not require a plate, the method is appropriately applicable to small lot production and multiproduct production.

In the configuration shown in the drawing, the manufacturing device 100 includes as the second ink application unit 13, a second ink application unit 13C ejecting a bluish-purple (cyan) second ink 22, a second ink application unit 13M ejecting a reddish-purple (magenta) second ink 22, a second ink ejection unit 13Y ejecting a yellow second ink 22, a second ink application unit 13W ejecting a white second ink 22 and a second ink application unit 13K ejecting a black second ink 22. In so doing, it is possible to widen the color regions expressed in the printing portions of the recorded matter ultimately obtained.

A piezo method, or a method ejecting ink due to foam (bubble) generated by heating the ink may be used as the droplet ejecting method (ink jet method); however, from the viewpoint of difficulty in changing the quality of the second ink 22, and the like, the piezo method is preferable.

The first ultraviolet irradiation unit 14 irradiates ultraviolet rays to the second ink 22 on the intermediate transfer medium 11 in the first polymerizing step. In particular, the first ultraviolet irradiation unit 14 irradiates the second ink 22 via the intermediate transfer medium 11; in other words, the unit irradiates with ultraviolet rays the surface of the intermediate transfer medium 11 to which the second ink 22 is applied from the opposite surface side. In so doing, rather than the polymerizable compound included in the second ink 22 being completely polymerized, while maintaining partial polymerization, it is possible to preferentially polymerize the parts of the polymerizable compound included in the second ink 22 having a predetermined thickness included in the regions of the surface side opposing the intermediate transfer medium 11. In other words, it is possible to cause the adhesiveness in the thickness direction of the second ink 22 on the intermediate transfer medium 11 to have a difference. As a result, while making the fixing strength of the printing portions ultimately formed (printing portions formed through the second polymerizing step) with respect to the recording medium 23 sufficiently superior, in the transferring step, it is possible to make the transferability of the second ink 22 to the recording medium 23 particularly superior.

As the first ultraviolet irradiation unit 14, for example, a metal halide lamp, a high pressure mercury vapor lamp, an ultrahigh pressure mercury vapor lamp, a deep ultraviolet lamp, a lamp in which a mercury lamp is excited from the outside using microwaves without electrodes, an ultraviolet laser, a xenon lamp, an ultraviolet ray light emitting diode (UV-LED) or the like may be used; however, among these, it is preferable to use a UV-LED.

Through the press roller 17A provided on the inner circumferential surface side of the intermediate transfer medium 11 and the press roller 17B also having a function as a transport unit (recording medium transport unit) of the recording medium 23, the transfer portions are configured by the second ink 22 being transferred from the intermediate transfer medium 11 to the recording medium 23. In the transfer portions, the recording medium 23 deforms so as to follow the surface shape of the press roller 17B (recording medium transport unit).

In transfer portions, the shape of the intermediate transfer medium and the shape of the recording medium (shape of the recording medium transport unit) may be any shape, for example, at least any one of them may be a planar shape; however, in the configuration shown in the drawing, the intermediate transfer medium 11 and the recording medium 23 are mutually curved in a convex shape toward the other side. In so doing, it is possible to more efficiently perform transfer (transferring step) of the second ink 22, and the productivity and yield of the recorded matter may be particularly superior. In addition, it is possible to make the fixing strength in the printing portions of the recorded matter particularly superior. In addition, this is advantageous from the viewpoint of size reductions of the manufacturing device 100.

In addition, in the transfer portions, in the locations to which the second ink 22 is transferred in the transferring step, it is preferable that the curvature of the intermediate transfer medium 11 be larger than the curvature of the recording medium 23. In so doing, it is possible to more efficiently perform transfer (transferring step) of the second ink 22, and the productivity and yield of the recorded matter may be particularly superior. In addition, it is possible to make the fixing strength in the printing portions of the recorded matter particularly superior.

The second ultraviolet irradiation unit 15 irradiates ultraviolet rays to the second ink 22 on the intermediate transfer medium 23 in the second polymerizing step. In so doing, in the ultraviolet irradiation, the unpolymerized polymerizable compound is polymerized, by the first ultraviolet irradiation unit 14 and it is possible to obtain a recorded matter according to the invention. In addition, due to the second ultraviolet irradiation unit 15, because it is possible to cause the polymerization reaction of the polymerizable compound to sufficiently progress, it is possible to make the fixing strength of the printing portions with respect to the recording medium to be sufficiently superior.

In the configuration shown in the drawing, the second ultraviolet irradiation unit 15 irradiates the second ink 22 with ultraviolet rays from the surface of the opposite side to the surface of side of the recording medium 23 to which the second ink 22 is transferred. In so doing, in a case in which the recording medium 23 has ultraviolet transmittance, it is possible for the polymerization reaction to sufficiently progress more reliably and more effectively across the entire thickness direction of the printing portions, and to make the fixing strength of the printing portions with respect to the recording medium 23, and the durability and reliability of the recorded matter particularly superior.

Moreover, in a case in which the recording medium 23 has ultraviolet transmittance, it is preferable that the second ultraviolet irradiation unit 15 be arranged so as to irradiate ultraviolet rays from the surface (printing surface) of the side of the recording medium 23 to which the second ink 22 is transferred.

As the second ultraviolet irradiation unit 15, for example, a metal halide lamp, a high pressure mercury vapor lamp, an ultrahigh pressure mercury vapor lamp, a deep ultraviolet lamp, a lamp in which a mercury lamp is excited from the outside using microwaves without electrodes, an ultraviolet laser, a xenon lamp, a UV-LED (ultraviolet ray light emitting diode) or the like may be used; however, among these, it is preferable to use a UV-LED.

In addition, the manufacturing device 100 includes, further to the downstream side than the printing portion, a cleaning unit 18 cleaning the intermediate transfer medium 11. In so doing, it is possible to prevent both the first ink 21 and the second ink 22 being attached in a state where foreign material (for example, constituent components of the second ink 22 or residue of modified materials thereof) is attached to the recording medium 23, and it is possible to manufacture a highly reliable recorded matter, repeatedly, over an extended period.

Next, the first ink, second ink and recording medium used in the invention will be described in detail.

First Ink

The first ink 21 includes a volatile first liquid.

Further, at least a portion of the first ink 22 applied to the transfer medium 11 in the first ink application step remains on the locations on the intermediate transfer medium 11 to which the second ink 22 is applied in the second ink application step. In so doing, it is possible to exhibit the effects as described above.

It is preferable that the first ink 21 reduce the surface free energy of the intermediate transfer medium 11. In so doing, it is possible to make the transferability of the second ink 22 from the intermediate transfer medium 11 to the recording medium 23 particularly superior, to make the productivity of the recorded matter particularly superior, and to more reliably form a printing portion in a desired shape.

Moreover, for the surface free energy value, measurement of the contact angle was performed using three types of liquid for which the surface free energy and the value of each component is known, and these values were determined using the Young-Dupre method or the extended Fowkes method. As the device, a solid surface energy analyzer CA-XE (manufactured by Kyowa Interface Science Co, Ltd) is used, and calculation of the measurement and the surface free energy is performed.

In addition, the boiling point $T_{bp1}$ of the first liquid is preferably 50° C. or more to 150° C. or less, and more preferably 70° C. or more to 100° C. or less. In so doing, it is possible to more reliably prevent the occurrence an adverse influence due to first liquid remaining on the recorded matter finally obtained, and to make the transferability of the second ink 22 from the intermediate transfer medium 11 to the recording medium 23 more reliably superior.

Examples of the first liquid include, for example, methanol (boiling point 65° C.), ethanol (boiling point 78° C.), ethyl acetate, methyl ethyl ketone (80° C.), 2-propanol (boiling point 82° C.), 2-methyl-propan-1-ol (boiling point 108° C.), toluene (boiling point 111° C.), 1-butanol (boiling point 118° C.), n-butyl acetate (boiling point 126° C.), ethylene glycol monomethyl ether (boiling point 124° C.), ethylene glycol dimethyl ether (boiling point 85° C.), ethylene glycol monoethyl ether (boiling point 135° C.), ethylene glycol monomethyl ether acetate (boiling point 145° C.), propylene glycol dimethyl ether (boiling point 97° C.), 2,3,-butanediol (boiling point 77° C.), and the like; and one type or two or more types used in combination selected therefrom may be used.

Among these, it is preferable that the first liquid be a monovalent alcohol. In so doing, it is possible to make the transferability of the second ink 22 from the intermediate transfer medium 11 to the recording medium 23 particularly superior, and to make the productivity of the recorded matter particularly superior, along with being capable of more reliably forming a printing portion in a desired shape. In addition, it is possible to more reliably prevent first liquid remaining on the recorded matter finally obtained. In addition, particularly ethanol is a material which is able to reliably exhibit the effects of the invention even in a case of small usage amounts, and additionally has little burden on the environment. Accordingly, it is preferable from the viewpoint of environmental protection.

It is preferable that the surface tension of the first ink 21 be lower than the surface tension (critical surface tension) of the intermediate transfer medium 11, and lower than the surface tension of the second ink 22. In so doing, since it is possible in the second ink application step to prevent involuntary spreading wetness of the second ink 22 on the intermediate transfer medium 11, and to form a film using a uniform first ink 21 in the first ink application step it is possible to more appropriately perform transfer from the intermediate transfer medium 11 to the recording medium 23 of the pattern using the second ink 22 and to make the pattern using the second ink 22 more reliably in a desired shape.

The first ink 21 may include other components in addition to the above-described first liquid. Example of the type of component include, for example, a moisturizing agent, a preservative, a fungicide, a pH adjuster, an antioxidant, a metal trapping agent, a moisturizing agent, a surfactant, a filler, an adhesion promoter, or the like.

The content rate of the first liquid in the first ink 21 is preferably 50 mass % or greater, and more preferably 70 mass % or greater. In so doing, even in a case where the usage amount of the first ink 21 is suppressed, the effects of using the first ink 21 in the invention as described above are sufficiently exhibited. In addition, since it is possible to suppress the usage amount of the first ink 21, the productivity of the recorded matter may be made particularly superior and, additionally, it is preferable from the viewpoint of resource saving. Moreover, in a case where the first ink 21 includes plural types of components as the first liquid, it is preferable that the sum of the content rates thereof satisfy the conditions described above.

Second Ink

The second ink 22 includes a coloring agent and a polymerizable compound polymerized by irradiation of ultraviolet rays. The second ink 22 is used in the formation of printing portions of the recorded matter.

Coloring Agent

As the coloring agent, various pigments and various dyes may be used; however using a pigment is particularly preferable. In so doing, it is possible to make the light resistance, heat resistance and the like of the printing portions particularly superior, and to maintain a stable external appearance across and extended period of time.

The manufacturing device 100 of the configuration shown in the drawing uses a black second ink 22, a bluish-purple (cyan) second ink 22, a reddish-purple (magenta) second ink 22, a yellow second ink 22, a light bluish-purple (cyan) second ink 22, and a light reddish-purple (magenta) second ink 22, as the second ink 22.

The respective colors of second ink 22 ordinarily contain a coloring agent of a color corresponding to the respective ink.

Examples of pigments configuring the chromatic second ink 22 (bluish-purple (cyan) second ink 22, reddish-purple (magenta) second ink 22, yellow second ink 22), light bluish-purple (cyan) second ink 22 and light reddish purple (magenta) second ink 22 include, for example, quinacridone-based pigments, quinacridonequinone-based pigments, dioxazine-based pigments, phthalocyanine-based pigments, anthrapyrimidine-base pigments, anthanthrone-based pigments, indanthrone-based pigments, flavanthrone-based pigments, perylene-base pigments, diketo-pyrrolo-pyrrole-based pigments, perinone-based pigments, quinophthalone-based pigments, anthraquinone-based pigments, thioindigo-based pigments, benzimidazolone-based pigments, isoindolinone-based pigments, azomethine-based pigments or azo-based pigments, and the like.

In particular, examples of pigments (bluish-purple pigment) configuring the bluish-purple (cyan) and light bluish-purple (cyan) second ink 22 include, for example, C.I. Pigment Blue-1, 2, 3, 15:3, 15:4, 15:34, 16, 22, 60; C.I. Vat Blue-4, 60, and the like, and is preferably C.I. Pigment Blue-15:3, 15:4, or 60.

In addition, examples of pigments configuring the reddish-purple (magenta) and light reddish-purple (magenta) second ink 22 include, for example, C.I. Pigment Red 5, 7, 12, 48 (Ca), 48 (Mn), 57 (Ca), 57:1, 112, 122, 123, 168, 184, 202; C.I. Pigment Violet 19 and the like, and is preferably C.I. Pigment Red 122, 202, 209; or C.I. Pigment Violet 19.

In addition, examples of pigments configuring the yellow second ink 22 include, for example, C.I. Pigment Yellow 1, 2, 3, 12, 13, 14C, 16, 17, 73, 74, 75, 83, 93, 95, 97, 98, 119, 110, 114, 128, 129, 138, 150, 151, 154, 155, 180, 185, 14, 34, 35, 35:1, 37, 37:1, 42, 43, 53, 55, 81, 94, 108, 109, 110, 139, 153, 157, 168, 184 and the like, and is preferably C.I. Pigment Yellow, 74, 109, 110, 128 or 138.

In addition, chromatic pigments other than the above may be used. Examples of such pigments include, for example, C.I. Pigment Red 2, 3, 17, 22, 23, 38, 81, 48:1, 48:2, 48:3, 48:4, 49:1, 52:1, 53:1, 63:1, 144, 146, 149, 166, 170, 176, 177, 178, 179, 185, 207, 209, 254, 101, 102, 105, 106, 108, 108:1; C.I. Pigment Green 7, 15, 17, 18, 19, 26, 36, 50; C.I. Pigment Blue 15, 15:1, 15:2, 15:6, 17:1, 18, 27, 28, 29, 35, 36, 80; C.I. Pigment Violet 1, 3, 23, 50, 14, 16; C.I. Pigment Orange 5, 13, 16, 36, 43, 20, 20:1, 104; or C.I. Pigment Brown 25, 7, 11, 33.

In addition, examples of pigments configuring the black second ink 22 include, for example, carbon blacks. Specifically, examples include No. 2300, 900, MCF 88, No. 20B, No. 33, No. 40, No. 45, No. 52, MA7, MA8, MA100, No. 2200B (all product names, manufactured by Mitsubishi Chemical Corporation) or the like; Carbon Black FW1, FW2, FW2V, FW18, FW200, 5150, 5160, 5170, Pretex 35, U.V. 140U, Special Black 6, 5, 4A, 4, 250 (all product names, manufactured by Degussa AG) or the like; Conductex SC, Raven 1255, 5750, 5250, 5000, 3500, 1255, 700 (all product names, manufactured by Columbian Carbon Co., Ltd) or the like; Regal 400R, 330R, 660R, Mogul L, Monarch 700, 800, 880, 900, 1000, 1100, 1300, 1400, Elf Tex 12 (all product names, manufactured by Cabot Corporation) or the like.

Moreover, in one type of ink, the color may be adjusted by using plural types of coloring agent components in combination. More specifically, for example, the black second ink 22 may use two or more types of coloring agent components other than black, and may present as black overall.

In addition, examples of pigments configuring the white second ink 22 include, for example, titanium oxide (for example, chloride process titanium oxide (rutile type) CR-50 (product name, manufactured by ISHIHARA SANGYO KAISHA, Ltd) or the like), barium sulfate, a hollow white resin emulsion, or the like.

In addition, pigments or the like having a glossy feeling, such as, for example, metallic powder or the like, may be used as the coloring agent. In particular, in a case in which the coloring agent includes metallic particles, there is a problem in which it is particularly difficult for the polymerization reaction of the polymerizable compound to progress; however, in the invention, because the ultraviolet rays are irradiated from different direction in a first curing step and second curing step, even if the second ink includes metallic particles, in the recorded matter ultimately obtained, it is possible for the polymerizable compound to be in a sufficiently polymerized and cured state.

In addition, the pigment may undergo a surface treatment. In so doing, it is possible to improve adjustment of hue, dispersion stability of pigment particles in the second ink 22, ejection stability and storage stability of the second ink 22, or the like.

The content rate of coloring agent in the second ink 22 is not particularly limited; however, it is preferably 0.2 mass % or greater to 10 mass % or less.

Polymerizable Compound

The polymerizable compound is a component polymerized by irradiation of ultraviolet light.

As the polymerizable compound, a monomer, oligomer or polymer (prepolymer) or the like having a polymerizable functional group may be used.

Examples of monomers as the polymerizable compound include, for example, allyl glycol, n-vinyl formamide, (2-methyl-2-ethyl-1,3-dioxolan-4-yl)-methyl acrylate, phenoxyethyl acrylate, isobornyl acrylate, methoxy diethylene glycol mono-acrylate, acryloylmorpholine, ethylene glycol dimethacrylate, diethylene glycol dimethacrylate, tri-propylene glycol diacrylate, 1,9-nonane diol diacrylate, polyethylene glycol #400 diacrylate, tetraethylene glycol dimethacrylate, 1,6-hexanediol dimethacrylate, neopentyl glycol dimethacrylate, 2-hydroxy-1,3-dimethacryloxy propane, trimethylolpropane trimethacrylate, trimethylolpropane modified triacrylate trimethylolpropane PO-modified triacrylate, glycerine PO-modified triacrylate, and the like.

Preferable examples of the oligomer as the polymerizable compound include, urethane-based oligomers, such as polyester-based urethane acrylate in a range of molecular weight from 500 or more to 20,000 or less, polyether-based urethane acrylate, polybutadiene-based urethane acrylate and polyol-based urethane acrylate. More specifically, U-4HA, U-15HA (both manufactured by Shin-Nakamura Chemical Co., Ltd) are preferred.

As the polymer (pre-polymer) as the polymerizable compound, for example, dendrimers, hyperbranched polymers, dendrigraft polymers and hyper-graft polymers which are solid at room temperature, and have molecular weight in a range from 2000 or more to 50000 or less (refer to "Dendric Polymers-High Functional World Spreading Multi-Branched Structures" Aoi Keigo, Kakimoto Masaaki Supervisor, NTS Co., Ltd.) may be suitably used.

In particular, it is preferable that the second ink 22 include, as the polymerizable compound, a liquid polymerizable compound independently forming a liquid, under conditions of the second ink application step (for example, under conditions of 25° C., 1 atmosphere). In so doing, because it is not necessary to use a volatile solvent as a constituent component of the second ink 22, or the content rate of a volatile solvent may be made low, in the manufacturing of the recorded matter it is possible to not perform or to simplify processing for volatilizing the solvent and it is possible to make the productivity of the recorded matter particularly superior. In addition, in the manufacturing of the recorded matter, it is possible to effectively prevent occurrence of a problem of lowering of the image quality of the printing portions, or the like, due to volatilizing of the solvent.

In particular, the liquid polymerizable compound is preferably the main component (main solvent) of the liquid components configuring the second ink 22. In so doing, effects such as above are more remarkably obtained.

With respect to all liquid components: 100 parts by mass configuring the second ink 22, it is preferable that the liquid polymerizable compound be included at a proportion of 50 or more parts by mass. In so doing, effects such as above are more remarkably obtained.

In addition, it is preferable that the second ink 22 include allyl glycol as the liquid polymerizable compound. In so doing, it is possible to more reliably form the printing portions in a desired shape. In addition, it is possible to make the productivity of the recorded matter particularly superior. The results are more remarkably exhibited in a case where the second ink 22 includes allyl glycol as the liquid polymerizable compound and the first liquid is ethanol. In addition, when the second ink 22 includes allyl glycol as the liquid polymerizable compound, the fixing strength of the printing portions in the recorded matter may be made particularly superior.

The content rate of polymerizable compound in the second ink 22 is not particularly limited; however, it is preferably 80 mass % or greater to 95 mass % or less.

Other Components

The second ink 22 may include components other than the above (other components). Examples of such components include, for example, a photopolymerization initiator, a moisturizing agent, a dispersant, a dispersion assistant, a surfactant, a thermopolymerization inhibitor, an antioxidant, a filler, an adhesion promoter, an ultraviolet absorber, a deflocculating agent, a volatile liquid component, curable components either polymerized or cured by methods other than irradiation of ultraviolet light, resin components not polymerization reactive or curable, organic solvents which are easily volatilized by heating with a boiling point of 250° C. or less at one atm (more preferably 70° C. or more to 250° C. or less) and the like.

Specific examples of the photopolymerization initiator include benzyl dimethyl ketal, α-hydroxyalkylphenone, α-aminoalkylphenone, acyl phosphine oxide, oxime ester, thioxanthone, α-dicarbonyl, anthraquinone, and the like.

In addition, photopolymerization initiators available under the product names Vicure 10, 30 (both manufactured by Stauffer Chemical Co), Irgacure 127, 184, 500, 651, 2959, 907, 369, 379, 754, 1700, 1800, 1850, 819, OXE01, Darcocur 1173, TPO, ITX (all manufactured by Ciba Specialty Chemicals Holding Inc.), Quantacure CTX (manufactured by Aceto Chemical Corporation), Kayacure DETX-S (manufactured by Nippon Kayaku Co., Ltd.), ESCURE KIP150 (manufactured by Lamberti S.p.A) may also be used.

It is preferable that the content rate of the photopolymerization initiator in the second ink be 3 mass % or greater to 10 mass % or less.

From the viewpoint of increasing pigment dispersibility, it is preferable that a dispersant be contained in the second ink. The dispersant is not particularly limited; however, a dispersant commonly used in the preparation of pigment dispersion liquids such as a molecular dispersant may be used. Specific examples thereof include one or more types of polyoxyalkylene polyalkylene polyamine, vinyl-based polymers and copolymers, acrylic based polymers and copolymers, polyester, polyamide, polyimide, polyurethane, amino based polymers, silicon-containing polymers, sulfur-containing polymers, fluorine-containing polymers, and epoxy resins and the like as a main component. As commercially available molecular dispersants, examples include the Discoall Series (N-509 and the like) by Dainichiseika Color & Chemicals Mfg. Co., Ltd., the Ajisper series by Ajinomoto Fine-Techno Co., Inc., the Solsperse series by Avecia Co., the Disperbyk series by BYK Japan KK, the Disparlon series by Kusumoto Chemicals, Ltd., and the like. In addition, according to the type of ink (watercolor pigment ink, non-watercolor pigment ink), it is preferable to control the hydrophilicity of the dispersant, and it is preferable that the control of the hydrophilicity be controlled using a hydrophilic group (for example, a hydroxyl group, a carboxyl group and a sulfo group).

Through the second ink 22 including a surfactant, it is possible to improve the droplet ejection stability using the ink jet method.

As the surfactant, it is preferable that, for example, silicone surfactants, such as polyester-modified silicone or polyether-modified silicone be used, and more preferable that polyether modified polydimethylsiloxane or polyester-modified polydimethylsiloxane be used. Specific examples include, BYK-347, 348, BYK-UV3500, 3510, 3530, 3570 (all manufactured by BYK Japan KK); however, they are not limited thereto.

By including a thermopolymerization inhibitor in the second ink 22, it is possible to make the storage stability of the second ink 22 particularly superior.

As the thermopolymerization inhibitor, for example, Irgastab UV-10 (manufactured by Ciba Specialty Chemicals Holding Inc.) or the like may be used; however, it is not limited thereto.

Recording Medium

Examples of the recording medium 23 include, for example, papers, such as ordinary paper, art paper, coated paper, matte paper, or dedicated ink jet paper; compacts (films and the like) configured from a plastic material, such as polyethylene terephthalate, polycarbonate, polystyrene, polyurethane, polyethylene, polypropylene; compacts (films and the like) formed from a metal; compacts (films and the like) configured from a ceramic; natural fibers, composite fibers and non-woven fiber, such as cotton, polyester, wool; and the like.

In particular, it is preferable that the recording medium 23 have ultraviolet transmittance. In so doing, it is possible to perform the second polymerizing step by irradiating ultraviolet rays from the surface of the opposite side to the side to which the second ink 22 is transferred. As a result, it is possible for the polymerization reaction to sufficiently progress more reliably and more effectively across the entire thickness direction of the printing portions, and to make the fixing strength of the printing portions with respect to the recording medium 23, and the durability and reliability of the recorded matter particularly superior.

As the recording medium 23, those that are non-absorbent or have low absorbency to ink may be suitably used. In the recording method using an intermediate transfer method of the related art, in a case where a recording medium which is non-absorbent or has low absorbency to ink is used, problems such as being unable to reliably form printing portions with a desired shape occur particularly remarkably; however, in the invention, the occurrence of such problems may be reliably prevented even when the recording medium is one which is non-absorbent or has low absorbency to ink. In other words, in a case where the recording medium is non-absorbent or has low absorbency to ink, the effects of the invention are more remarkably exhibited.

Here, a "non-absorbent or low absorbency to ink" recording medium is a recording medium in which, in the Bristow method, the water absorption amount of the printing surface from the start of contact up to 30 msec is 10 ml/m² or less. The Bristow method is the method in the most widespread use as a method of measuring a liquid absorption amount in a short time, and is also employed by the Japan Technical Association of the Pulp and Paper Industry (JAPAN TAPPI). The details of the test method are disclosed in the standard No. 51 "Paper and Cardboard—Liquid Absorbency Test Method—Bristow Method" of the "JAPAN TAPPI Paper Pulp Test Methods 2000 Edition".

It is preferable that the recording medium 23 be a film (including ones formed in a cylindrical or bag-like shape) configured from a plastic material. In the related art, in a case where a recording medium is a film composed from a plastic material, it is difficult to reliably form printing portions in a desired shape, and additionally, problems of it being difficult to make the fixity of the printing portions to the printing medium sufficiently superior occur particularly remarkably. In contrast, according to the invention, it is possible to reliably prevent the occurrence of the above problems even in cases where the recording medium is a film composed from a plastic material. In other words, in a case where the recording medium is a film composed from a plastic material, the effects according to the invention are more remarkably exhibited.

Above, in the manufacturing method and the manufacturing device of the invention, fixity is excellent, and it is possible to reliably and efficiently manufacture the recorded matter provided with printing portions having a desired shape.

Recorded Matter

Next, the recorded matter of the invention will be described.

The recorded matter of the invention is manufactured using the method of manufacturing of the above-described invention. In so doing, a recorded matter may be provided with superior fixity and include printing portions having a desired shape.

The recorded matter of the invention is suitable to any application, for example, a packaging material for a variety of products, such as food products and everyday items, and various decorations and the like.

Above, the invention has been described based on preferred embodiments; however, the invention is not limited thereto.

For example, in the embodiments described previously, a case in which the intermediate transfer medium is an endless belt is described as representative; however, in the invention, the intermediate transfer medium may be any shape, and, for example, may be in a drum shape (roll shape).

In addition, in the above-described the invention, a case in which the manufacturing device is provided with separate light sources as the first ultraviolet irradiation unit and second ultraviolet irradiation unit was described as representative; however, for example, the first ultraviolet irradiation unit and the second ultraviolet irradiation unit may irradiate branched ultraviolet rays from the same light source.

In addition, the respective portions configuring the manufacturing device of the inventions may be substituted with arbitrary configurations able to exhibit the same functions. In addition, arbitrary constituent matters may be applied. For example, the embodiment of the invention may have a heating unit heating the recording medium onto which the second ink is transferred. In so doing, for example, it is possible to reliably prevent the first liquid remaining on the recording medium. In addition, it is possible to make the reliability of the recorded matter in which the polymerization of the polymerization compound more reliably progresses particularly superior, and furthermore, it is possible to further improve the reaction speed of the polymerization reaction, and to make the productivity of the recorded matter particularly superior. In addition, the manufacturing device of the invention may be provided with a recovery mechanism recovering the first liquid.

In addition, the manufacturing device of the invention may further have, in addition to the above-described steps, other steps (preprocessing, intermediate processing, post-processing).

EXAMPLES

1. Manufacturing of Recorded Matter

The recorded matter was manufactured as described below.

Example 1

First, a manufacturing device as shown in FIGURE was prepared.

The intermediate transfer medium configuring the manufacturing device was configured of a 100 μm thick Teijin Tetoron Film G2 transparent PET film (manufactured by Teijin DuPont Films Japan Ltd., transmittance to ultraviolet rays: 50% or higher, surface tension: 44 mN/m). In addition, in the transfer portion, the curvature of the intermediate transfer medium was larger than the curvature of the press roller as the recording medium transport unit.

First Ink Application Step

First, according to the ink jet method, ethanol (boiling point: 78° C., surface tension: 22 mN/m) as the first ink was ejected in a predetermined pattern towards the intermediate transfer medium from the first ink application unit. Such a first ink causes the surface free energy of the intermediate transfer medium to be reduced. In addition, in this step, the thickness of the layer using the first ink was 1 μm.

Second Ink Application Step

Next, according to the ink jet method, the second ink was applied selectively toward locations on the intermediate transfer medium to which the first ink was applied from the second ink application unit. As the second ink, 6 types of black ink, bluish-purple (cyan) ink (cyan ink), reddish-purple (magenta) ink (magenta ink), yellow ink and light bluish-purple (cyan) ink (light cyan ink) and light reddish-purple (magenta) ink (light magenta ink) were used. At this time, the respective colors of second ink were not overlapped.

Each ink (second ink) was prepared as below.

Preparation of Second Ink

Ink including allyl glycol as the liquid polymerizable compound was prepared.

Black Ink B-1

14 parts by mass of allyl glycol (monomer, manufactured by Nippon Nyukazai Co., Ltd., hereinafter referred to as "AG"), and 1.2 parts by mass of Discoall N-509 (dispersant, polyoxyalkylene polyalkylene polyamine, product name manufactured by Dainichiseika Color & Chemicals Mfg. Co., Ltd.) were mixed and stirred for 20 minutes at 40° C.

A mixed liquid was obtained by adding 6 parts by mass of Carbon Black MA 7 (product name manufactured by Mitsubishi Chemical Corporation) to the liquid after stirring, and was stirred and dispersed for 2 hours in a tabletop sandmill (manufactured by Hayashi Shoten) for at 2160 rpm along with 1.5 times the mass of the mixed liquid of zirconia glass beads (diameter 1.5 mm). After dispersion, the liquid was filtered with a SUS mesh filter with a 0.1 mm diameter, and the dispersion liquid was prepared.

To the dispersion liquid, U-15HA (urethane acrylate oligomer, product name manufactured by Shin-Nakamura Chemical Co., Ltd, weight average molecular weight 2300) Irgacure 127 and 819 (photopolymerization initiator, both product names manufactured by BASF, Ltd.), Irgastab UV-10 (polymerization inhibitor, product name manufactured by BASF, Ltd.), BYK-UV3500 (surfactant, product name manufactured by BYK Japan KK) and AG (remainder) were added in the quantities (parts by mass) shown in Table 2, and stirred for 1 hour at room temperature. After stirring, the liquid was filtered using a membrane filter with a 5 μm diameter, and the black ink was prepared having the composition shown in Table 2. Moreover, of the 10 parts by mass of photopolymerization initiator 10 in Table 2, 7 parts by mass is Irgacure 127 and 3 parts by mass is Irgacure 819.

Cyan Ink B2

Other than making the coloring agent from carbon black to cyan pigment (C.I. Pigment Blue-15:4, manufactured by DIC Corporation), and the components as disclosed in Table 2, the dispersion liquid was prepared in the same manner as during preparation of the black ink B-1. Moreover, when the dispersion liquid was prepared, 14 parts by mass of AG was added.

To the dispersion liquid, as monomers, N-vinyl formamide (hereinafter, referred to as "NVF"), U-15HA, Irgacure 127 and 819, Irgastab UV-10, BYK UV 3500 and AG (remainder) were added in the quantities (parts by mass) shown in Table 2, and stirred for one hour at room temperature. After stirring, the liquid was filtered using a membrane filter with a 5 μm diameter, and the cyan ink was prepared having the composition shown in Table 2. Moreover, of the 69.8 parts by mass of monomer in Table 2, 59.8 parts by mass is AG and 10 parts by mass is NVF. Moreover, of the 5 parts by mass of photopolymerization initiator in Table 2, 3 parts by mass is Irgacure 127 and 2 parts by mass is Irgacure 819.

Magenta Ink B-3

Other than making the coloring agent from carbon black to magenta pigment (C.I. Pigment Violet 19, manufactured by BASF, Ltd.), and the components as disclosed in Table 2, the dispersion liquid was prepared in the same manner as during preparation of the black ink B-1. Moreover, when the dispersion liquid was prepared, 14 parts by mass of AG was added.

To the dispersion liquid, U-15HA, Irgacure 127 and 819, Irgastab UV-10, BYK UV 3500, AG (remainder) and ion exchange water were added in the quantities (parts by mass) shown in Table 2, and stirred for one hour at room temperature. After stirring, the liquid was filtered using a membrane filter with a 5 μm diameter, and the magenta ink was prepared having the composition shown in Table 2. Moreover, of the 3 parts by mass of photopolymerization initiator in Table 2, 2 parts by mass is Irgacure 127 and 1 part by mass is Irgacure 819.

Yellow Ink B4

Other than making the coloring agent from carbon black to yellow pigment (C.I. Pigment Yellow 150, manufactured by Wynn Chemical, Ltd.), and the components as disclosed in Table 2, the dispersion liquid was prepared in the same manner as during preparation of the black ink B-1. Moreover, when the dispersion liquid was prepared, 14 parts by mass of AG was added.

To the dispersion liquid, U-15HA, Irgacure 127 and 819, Irgastab UV-10, BYK UV 3500, and AG (remainder) were added in the quantities (parts by mass) shown in Table 2, and stirred for one hour at room temperature. After stirring, the liquid was filtered using a membrane filter with a 5 μm diameter, and the yellow ink was prepared having the composition shown in Table 2. Moreover, of the 7.6 parts by mass of photopolymerization initiator in Table 2, 5 parts by mass is Irgacure 127 and 2.6 parts by mass is Irgacure 819.

Light Cyan Ink B-5

Other than making the coloring agent from carbon black to cyan pigment (C.I. Pigment Blue-15:4, manufactured by DIC Corporation), and the components as disclosed in Table 2, the dispersion liquid was prepared in the same manner as during preparation of the black ink. Moreover, when the dispersion liquid was prepared, 14 parts by mass of AG was added.

To the dispersion liquid, NVF, U-15HA, Irgacure 127 and 819, Irgastab UV-10, BYK UV 3500, and AG (remainder) were added in the quantities (parts by mass) shown in Table 2, and stirred for one hour at room temperature. After stirring, the liquid was filtered using a membrane filter with a 5 μm diameter, and the light cyan ink was prepared having the composition shown in Table 2. Moreover, of the 50 parts by mass of monomer in Table 2, 35 parts by mass is AG and 15 parts by mass is NVF. Moreover, of the 4.36 parts by mass of photopolymerization initiator in Table 2, 3 parts by mass is Irgacure 127 and 1.36 parts by mass is Irgacure 819.

Light Magenta Ink B-6

Other than making the coloring agent from carbon black to magenta pigment (C.I. Pigment Violet 19, manufactured by BASF, Ltd.), and the components as disclosed in Table 2, the dispersion liquid was prepared in the same manner as during preparation of the black ink B-1. Moreover, when the dispersion liquid was prepared, 14 parts by mass of AG was added.

To the dispersion liquid, U-15HA, Irgacure 127 and 819, Irgastab UV-10, BYK UV 3500, AG (remainder) and ion exchange water were added in the quantities (parts by mass) shown in Table 2, and stirred for one hour at room temperature. After stirring, the liquid was filtered using a membrane filter with a 5 μm diameter, and the light magenta ink was prepared having the composition shown in Table 2. Moreover, of the 3 parts by mass of photopolymerization initiator in Table 2, 2 parts by mass is Irgacure 127 and 1 part by mass is Irgacure 819.

The compositions of the above black ink B-1 to light magenta ink B-6 are collected in Table 1. Moreover, the surface tensions of the above B-1 to B-6 were 26 to 28 mN/m.

TABLE 1

| | Pigment | Polymerizable Compound | | Dispersant | Surfactant | Polymerization Inhibiter | Photopolymerization | Ion Exchange | Total |
| --- | --- | --- | --- | --- | --- | --- | --- | --- | --- |
| | | Monomer | Oligomer | N-509 | UV3500 | UV-10 | Initiator | Water | |
| Black Ink B-1 | 6 | 52.4 | 30 | 1.2 | 0.2 | 0.2 | 10 | — | 100 |
| Cyan Ink B-2 | 4 | 69.8 | 20 | 0.8 | 0.2 | 0.2 | 5 | — | 100 |
| Magenta Ink B-3 | 5 | 77.6 | 10 | 1 | 0.2 | 0.2 | 3 | 3 | 100 |
| Yellow Ink B-4 | 10 | 60 | 20 | 2 | 0.2 | 0.2 | 7.6 | — | 100 |
| Light Cyan Ink B-5 | 0.2 | 50 | 45 | 0.04 | 0.2 | 0.2 | 4.36 | — | 100 |
| Light Magenta Ink B-6 | 0.5 | 57 | 30 | 0.1 | 0.2 | 0.2 | 3 | 9 | 100 |

First Polymerizing Step

Next, the first ultraviolet irradiation unit (manufactured by Fusion UV Systems, Inc., D lamp) was used, ultraviolet rays were irradiated from the opposite surface side to the surface of the intermediate transfer medium to which the second ink was applied, the polymerizable compound included in the second ink partially polymerized. In this step, ultraviolet rays were irradiated onto a region 20 cm wide, and the irradiation intensity of ultraviolet rays was 100 mW/cm$^2$.

Transferring Step

Next, in the transfer portions, the second ink irradiated with ultraviolet rays in the first polymerizing step was transferred to a PVC film: ViewCal (manufactured by Sakurai Co., Ltd., model number VC 9700) as the recording medium. In this step, the transfer pressure was 30 kg/cm$^2$.

In the transfer portions, the curvature of the intermediate transfer medium was larger than the curvature of the recording medium. In other words, the radius of curvature of the intermediate transfer medium in the transfer portions was 30 mm, and the radius of curvature of the recording medium in the transfer portions was 50 mm.

Second Polymerizing Step

Thereafter, the second ultraviolet irradiation unit (manufactured by Fusion UV Systems, Inc., D lamp) was used, ultraviolet rays were irradiated from the opposite surface side to the side of the intermediate transfer medium to which the second ink of the recording medium was applied, the polymerizable compound configuring the second ink was cured, and the printing portions were fixed to the recording medium. In this step, ultraviolet rays were irradiated onto a region 30 cm wide, and the irradiation intensity of ultraviolet rays was 200 mW/cm$^2$.

Example 2

Other than using 2-propanol (boiling point: 82° C., surface tension: 23.7 mN/m) as the first ink, the recorded matter was manufactured in the same manner as Embodiment 1.

Example 3

Other than using a mixed liquid of 70 parts by mass of ethanol, 29.8 parts by mass of water, 0.5 parts by mass of a mixed liquid (surface tension: 25 mN/m) of BYK-348 (silicon-based surfactant, product name manufactured by BYK Japan KK) as the first ink, the recorded matter was manufactured in the same manner as Embodiment 1.

In any of the Examples 1 to 3, the surface tension of the first ink was smaller than the surface tension of the intermediate transfer medium, and smaller than the surface tension of the second ink.

Comparative Example 1

A manufacturing device without a first ink application unit was used, and other than not performing the first ink application step, the recorded matter was manufactured in the same manner as Example 1.

Comparative Example 2

A manufacturing device without a first ultraviolet irradiation unit was used, and other than not performing the first polymerizing step, the recorded matter was manufactured in the same manner as Embodiment 1.

Comparative Example 3

A manufacturing device without a second ultraviolet irradiation unit was used, and other than not performing the second polymerizing step, the recorded matter was manufactured in the same manner as Embodiment 1.

Comparative Example 4

Other than the irradiation intensity of ultraviolet rays being changed to 500 mW/cm$^2$ in the first polymerizing step, the recorded matter was manufactured in the same manner as Comparative Example 3.

Comparative Example 5

A manufacturing device in which the first ultraviolet irradiation unit was arranged on the surface side of the intermediate transfer medium to which ink was applied was used, and other than performing irradiation of ultraviolet rays to the ink from the surface side (outer surface side of the ink) of the intermediate transfer medium to which the ink is applied in the first polymerizing step, the recorded matter was manufactured in the same manner as in Embodiment 1.

The configuration of the manufacturing device and the manufacturing conditions for each of the Examples and Comparative Examples are collected and shown in Table 2.

Moreover, in the table, in the boiling point column, boiling points at one atmosphere are shown. In addition, all of the recording media used in the embodiment and comparative examples were non-absorbent.

TABLE 2

| | Has First Ink Ejection Unit? | Position of First Ultraviolet Irradiation Unit | Has Second Ultraviolet Irradiation Unit? | Curvature Radius of Intermediate Transfer Medium in Transfer Portions (mm) | Curvature Radius of Recording Medium in Transfer Portions (mm) | Boiling Point $T_{bp1}$ of First Liquid $T_{bp1}$ (° C.) | Irradiation Intensity using First Ultraviolet Irradiation Unit (mW/cm$^2$) | Irradiation Intensity using Second Ultraviolet Irradiation Unit (mW/cm$^2$) |
|---|---|---|---|---|---|---|---|---|
| Example 1 | Y | Inner surface Side | Y | 30 | 50 | 78 | 100 | 200 |
| Example 2 | Y | Inner surface Side | Y | 30 | 50 | 82 | 100 | 200 |
| Example 3 | Y | Inner surface Side | Y | 30 | 50 | 85 | 100 | 200 |
| Comparative Example 1 | N | Inner surface Side | Y | 30 | 50 | — | 100 | 200 |
| Comparative Example 2 | Y | N/A | Y | 30 | 50 | 78 | — | 200 |
| Comparative Example 3 | Y | Inner surface Side | N | 30 | 50 | 78 | 200 | — |
| Comparative Example 4 | Y | Inner surface Side | N | 30 | 50 | 78 | 500 | — |
| Comparative Example 5 | Y | Outer surface Side | Y | 30 | 50 | 78 | 100 | 200 |

2. Evaluation

Evaluation relating to the recorded matter obtained as described above was performed as follows.

2.1 Evaluation of Appearance

Each of the recorded matters manufactured in each of the Examples and Comparative Examples was observed visually, and evaluated according to the following criteria.

A: printing portions with a desired shape were reliably formed and printing defects due to flowing, cissing and the like were not recognized. (Excellent transferability)

B: Slight disturbance only in fine line portions of the printing portions was recognized. (satisfactory transferability)

C: Clear disturbance recognized in the fine line portions of the printing portions; however, disturbance not recognized in other locations.

D: In addition to disturbance in the fine line portions, slight disturbance recognized in other locations.

E: In addition to disturbance in the fine line portions, clear disturbance also recognized in other locations.

2.2 Evaluation of Fixing Strength

A fastness test was performed on the solid color printing portions with a 100% duty of each ink for each recorded matter manufactured in each of the Examples and Comparative Examples using an AB-301S Color Fastness Rubbing Tester Model II (manufactured by Tester Sangyo Co., Ltd.) in accordance with the method disclosed in the Japanese Industrial Standards JIS L 0849, in which a white cotton cloth in a dried state was attached to the tip of the rubbing block and reciprocated 100 times at a speed of 30 reciprocations a minute under a load of approximately 2 N/100 mm$^2$. The density of the printing portions before and after testing was measured using an X-Rite model 404 (manufactured by X-Rite, Inc.), and the average density residual ratio was calculated for 10 locations, and determined according to the following standard. It is noted that the larger the density residual ratio, the better the fixing strength of the printing portions with respect to the recording medium.

AA: Average density residual ratio is 90% or higher

A: Average density residual ratio is from 80% or higher to less than 90%

B: Average density residual ratio is from 60% or higher to less than 80%

C: Average density residual ratio is from 40% or higher to less than 60%

D: Average density residual ratio is from 20% or higher to less than 40%

E: Average density residual ratio is less than 20%, or fixing was not possible.

The results are shown in Table 3. Moreover, based on appearance, those having a value of D or E were not worth evaluating, and are left blank (–).

TABLE 3

| | Appearance | Fixing Strength |
|---|---|---|
| Example 1 | A | AA |
| Example 2 | A | AA |
| Example 3 | B | AA |
| Comparative Example 1 | E | — |
| Comparative Example 2 | D | — |
| Comparative Example 3 | A | C |
| Comparative Example 4 | E | — |
| Comparative Example 5 | E | — |

As is clear from Table 3, printing portions having a desired shape are reliably formed on the recorded matter of the invention, and the fixing strength of the printing portions to the recording medium is excellent. In addition, in the invention, it is possible to manufacture a recorded matter with excellent productivity and yield. In addition, in the invention, it is possible to manufacture the recorded matter at low energy. In contrast, in the Comparative Examples, satisfactory results were not obtained.

In addition, regarding each of the examples and comparative examples, the composition of the second ink was changed, and other than a case of using one containing a volatile solvent propylene glycol instead of one only including oligomer U-15HA independently forming a solid as the polymerizable compound, when the recorded matter was manufactured in the same manner as above, a similar trend to above was observed; however, in the example using the second ink including allyl glycol as the polymerizable compound, particularly superior results were obtained.

The entire discloser of Japanese Patent Application No. 2012-050115, filed Mar. 7, 2012 is expressly incorporated by reference herein.

What is claimed is:

1. A method of manufacturing a recorded matter comprising:

applying a first ink including a volatile first liquid to an intermediate transfer medium having ultraviolet transmittance;

applying, using an ink jet method, a second ink including a coloring agent and a polymerizable compound polymerized by irradiation of ultraviolet rays to locations on the intermediate transfer medium to which the first ink is applied;

partially polymerizing the polymerizable compound by irradiating surface side of the intermediate transfer medium to which the second ink is applied with ultraviolet rays from the opposite side surface;

transferring the second ink irradiated by ultraviolet rays in the polymerizing of the polymerizable compound to a recording medium; and curing the polymerizable compound configuring the second ink transferred to the recording medium, wherein surface tension of the first ink is lower than surface tension of the intermediate transfer medium and lower than surface tension of the second ink, wherein the content rate of coloring agent in the second ink is in the range of 0.2 mass % to 10 mass %.

2. The manufacturing method of a recorded matter according to claim 1, wherein the first ink causes the surface free energy of the intermediate transfer medium to be reduced.

3. The method of manufacturing a recorded matter according to claim 1, wherein the second ink includes as the polymerizable compound, a liquid polymerizable compound independently forming a liquid, when irradiated with ultraviolet rays to the locations on the intermediate transfer medium to which the first ink is applied.

4. The method of manufacturing a recorded matter according to claim 3, wherein the second ink includes allyl glycol as the liquid polymerizable compound.

5. The method of manufacturing a recorded matter according to claim 1, wherein the applying of the first ink is performed using an ink jet method.

6. A recorded matter manufactured using the method according to claim 2.

7. A recorded matter manufactured using the method according to claim 3.

8. A recorded matter manufactured using the method according to claim 4.

* * * * *